No. 615,728. Patented Dec. 13, 1898.
A. MAUSER.
TRANSPORTABLE FENCE.
(Application filed Apr. 25, 1898.)

(No Model.)

Witnesses:

Inventor.
Alfons Mauser.
by Herbert W. T. Jenner,
Attorney.

UNITED STATES PATENT OFFICE.

ALFONS MAUSER, OF STUTTGART, GERMANY.

TRANSPORTABLE FENCE.

SPECIFICATION forming part of Letters Patent No. 615,728, dated December 13, 1898.

Application filed April 25, 1898. Serial No. 678,716. (No model.)

*To all whom it may concern:*

Be it known that I, ALFONS MAUSER, mechanical engineer, a subject of the King of Würtemberg, residing at Stuttgart, in the Kingdom of Würtemberg and Empire of Germany, have invented certain new and useful Improvements in Chains for Use in Making Collapsible and Transportable Fencing; and I do hereby declare the following to be a full, clear, and exact description of the invention, such as will enable others skilled in the art to which it appertains to make and use the same.

This invention has for its object chains which are formed of pieces of sheet metal riveted together, more particularly for making collapsible and easily-transportable fences.

Figure 1:
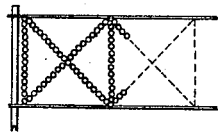
Figure 2:
Figure 3:
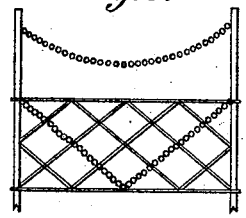

In the accompanying drawings, Figures 1 to 3 show several methods of arrangement of the improved chains in the form of fencing-wire, and Figs. 4 to 8 show several forms of arrangement of the chains separately.

Figure 4:

The form of chain shown in Fig. 4 consists of sheet-metal rings *a*, which overlap like roofing-tiles and are held together by means of rivets *b*.

Figure 5:
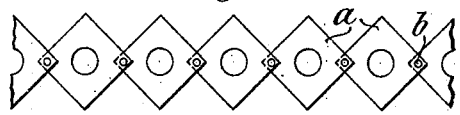

In the form of construction shown in Fig. 5 rectangular pieces of sheet metal *a* are employed, each having a round part stamped out.

Figure 6:
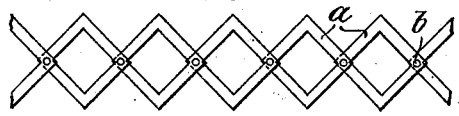

In the form of construction shown in Fig. 6 rectangular sheet-metal pieces are also employed, which, however, are provided with rectangular apertures.

Figure 7:
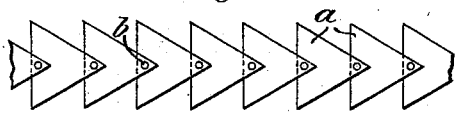
Figure 8:
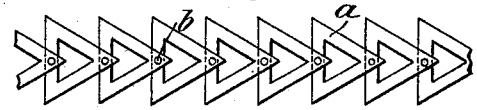

In Figs. 7 and 8 two chains are shown, formed of triangular pieces of sheet metal, the said pieces of sheet metal being in one case, Fig. 7, solid, while in the other case, Fig. 8, they are provided with triangular apertures.

The sheet-metal links are of ornamental form, and to make them adaptable for use as a member of a fence, and to permit them to be folded into the form of a bar the links in each chain are all similar to each other and are greater in width than the distance between the centers of their pivots.

The riveting together of the separate sheet-metal pieces *a* is carried out in such a way that the latter do not adhere firmly together, but are revoluble or pivoted one on the other. The separate members may therefore be folded together, so that they lie one above the other. If, for instance, in the chain shown in Fig. 4 the right-hand extreme member *a* be folded over the adjacent member until both completely coincide and then the next ring be turned over these two, lying one on top of the other, it is evident that a whole chain of the form shown in Fig. 4 may be folded together to form a single hollow cylinder. Similarly the chain shown in Fig. 5 may be folded into a rectangular bar with a round perforation, and a chain, as shown in Fig. 6, may be folded to form a rectangular bar with a rectangular perforation, while the chains shown in Figs. 7 and 8 will when folded together form bars of double dovetail outline.

The chains hereinbefore described may be employed in various ways for constructing collapsible and transportable fences. If, for instance, it be assumed that the vertical posts and horizontal connecting-rods, which form the framework of a fence, are removably connected in any suitable manner with one another and that the fields of this fence are inclosed with the chain shown in Fig. 1, it is evident that to allow of its more easy transport the chains forming such a fence may be folded in the manner hereinbefore described into rod-like bodies and packed up together with the posts and cross-bars.

Fig. 2 shows a lattice-work formed of chains crossing each other, which also may be utilized with fence-posts of the kind described in connection with Fig. 1.

The improved chains may of course be employed as suspension-chains, and the fence of a field may be formed partly of ordinary metal bars or strips or the like and partly out of the above-mentioned chains in order to obtain any desired pattern. Fig. 3 shows such an arrangement of fence.

Having now particularly described and ascertained the nature of my said invention and in what manner the same is to be performed, I declare that what I claim is—

1. In a transportable fence, the combination, with supporting-posts, of a fence member carried by the said posts and formed of a series of similar ornamental links laid to overlap each other like roof-tiles and having their overlapping portions pivoted together, the width of each link being greater than the distance between its pivots, and the said links being foldable into the form of a bar when the said member is removed from the said posts, substantially as set forth.

2. In a transportable fence, the combination, with supporting-posts, of a fence member formed of a series of pivoted links laid to overlap each other like roof-tiles, said links being foldable into the form of a bar when the member is removed from the posts, substantially as set forth.

In witness whereof I have hereunto signed my name in the presence of two subscribing witnesses.

ALFONS MAUSER.

Witnesses:
CARL SWICK,
W. WAGNER.